Dec. 24, 1968        G. V. JAKEWAY        3,417,536

ATTACHABLE METAL OBJECT AND METHOD FOR MAKING THE SAME

Filed Nov. 7, 1966        2 Sheets-Sheet 1

INVENTOR.
GERALD V. JAKEWAY
BY
ATTORNEYS

Dec. 24, 1968  G. V. JAKEWAY  3,417,536
ATTACHABLE METAL OBJECT AND METHOD FOR MAKING THE SAME
Filed Nov. 7, 1966  2 Sheets-Sheet 2

INVENTOR.
GERALD V. JAKEWAY
BY
ATTORNEYS

United States Patent Office 3,417,536
Patented Dec. 24, 1968

3,417,536
ATTACHABLE METAL OBJECT AND METHOD
FOR MAKING THE SAME
Gerald V. Jakeway, Grand Rapids, Mich., assignor to
Keeler Brass Company, Grand Rapids, Mich., a corporation of Michigan
Filed Nov. 7, 1966, Ser. No. 592,374
20 Claims. (Cl. 52—673)

ABSTRACT OF THE DISCLOSURE

A method of making metal trim letters and the like having integral attachment studs, wherein the trim letter and the integral studs are formed by means of a progressive die stamping procedure in which a rough blank of metal is first formed to have stud blank areas, and such areas are then moldably upset to form the attachment studs, with such moldable upsetting including the gathering of stock from some portions of the stud blank areas into the stud projections themselves and the finished stud projections therefore having a thickness which can be greater than that of the original rough blank stock.

---

This invention relates to the manufacture of structures having a body portion and attachment stud elements, more particularly relatively small ornamental and sometimes functional objects of decorative hardware frequently referred to as "trim." It also relates to a novel method for manufacturing such objects.

Objects of decorative hardware such as letters of the alphabet and words, insignia, symbols and the like made from a "bright metal" are used upon practically countless objects of manufacture at the present time, and are familiar to almost everyone. While many different specific types of such objects are made and used, a very large number of these objects are attached to their supporting surfaces by means of small studs secured to the decorative objects in one way or another and extending generally normally away from the objects so that the studs may be pressed into appropriate apertures in the supporting surface.

The forming and attachment of the aforesaid studs to the trim objects has always posed a manufacturing problem. These studs must obviously be sufficiently strong to hold the trim object securely in place once it is mounted, but the entire trim object is normally a relatively inexpensive article, and consequently time-consuming or costly techniques in forming and attaching the studs cannot be used. This considerably restricts the number of ways which are available by which the objects with their attached mounting studs may be manufactured and, as stated, a manufacturing problem seems always to have existed in this area.

According to current manufacturing preferences, the decorative trim objects are made through stamping techniques practiced upon very soft aluminum alloys, sometimes referred to as "dead soft" alloys. These provide very satisfactory trim objects, but they have created even further problems in the manufacturing and attaching of the mounting studs. Where the metal stock being worked with has sufficient body, and where the design of the trim object permits, it has been a prevalent practice to attempt to form the mounting studs through impact extruding, that is, forming the projecting studs by "squirting" metal outwardly through an apertured stamping die struck hard against the metal. In other applications, resort was made to aluminum welding to fasten studs to the trim objects, which had been made as separate pieces. As is well known, this is a costly and difficult process, and consequently it really was unsuited to the subject matter at hand and was rarely used.

In U.S. Patent No. 3,200,551, the present inventor has disclosed a technique of securing separately-made studs to a metal trim object, which technique has unique features and, in the proper situation, provides very satisfactory results. Nonethelsess, the underlying general problem involved has heretofore remained unsolved, and a method of more universal application has definitely remained as something the future would have to produce.

It is a major object of the present invention to provide as an article of manufacture a new form of trim object or structure which has integral attachment studs, and it is also a major object of the invention to provide a new method of manufacturing such structures, which method is of extremely general application and eminently suitable to numerous manufacturing situations.

It is a further major object of the present invention to provide a method of the foregoing character which utilizes stamping or swaging techniques exclusively, and by which a flat piece of stock may, through a continuing progressive succession of the such stages making up the steps of the instant method, readily and quickly be formed into a chain-like succession of trim objects with integral attachment studs prortuding therefrom.

The foregoing major objects of the invention and the advantages provided thereby together with other objects and advantages equally a part thereof, will become increasingly apparent following consideration of the ensuing specification and its appended claims, particularly when taken in conjunction with the accompanying illustrative drawings setting forth a preferred embodiment of the invention.

Briefly stated, the present invention provides a structure, and a method of manufacturing such structures, having a body portion and integral attachment studs. The structure provided by the invention has a body with a desired shape and a number of attachment studs which are integral with the body and which project outwardly therefrom at desired angles. Preferably, these studs are thicker than the sheet stock from which the structure is formed. The method of the invention provides such structures by first forming from sheet stock a rough blank for a trim object having a particular desired shape, which rough blank also has a desired number of integral appendages which comprise blanks for studs in areas where attachment studs are desired to be located. The finished trim object is then made from the rough blank through a progressive succession of stamping or swaging steps, during which portions of the aforesaid stud blanks are moldably upset through the application of pressure, such that a stud projection is formed on the stud blank by the gathering of material from some areas on the stud blank to other areas thereof. In this manner, the stud projection so formed may be made to have a predetermined thickness corresponding to that which the finished attachment studs are desired to have, which may well be excess of the thickness of the original stud blank itself. A trimming step is included for removing those portions of the stud blank other than the stud projection formed thereon to produce a finished attachment stud, which then may be bent relative to the trim body so that the finished stud extends away from the trim body at a desired angle.

Figure 1:
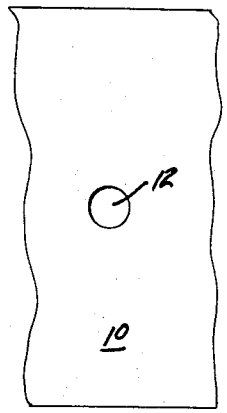
FIG. 1 is a fragmentary overhead plan view showing a typical piece of work stock after having undergone a first stamping operation.

Referring now in more detail to the drawings, which collectively illustrate each particular operation in a preferred embodiment of the present method, a portion of the preferred elongate, flat stock is seen at 10, and in FIG. 1 the initial one of a plurality of separate, sequential stamping operations has been carried out, in which a circular guide hole 12 has been punched through the stock 10. As will be understood, the term "stamping" as used herein is intended to embrace a variety of different forming steps accomplished through the application of dies under pressure to the workpiece.

Figure 2:
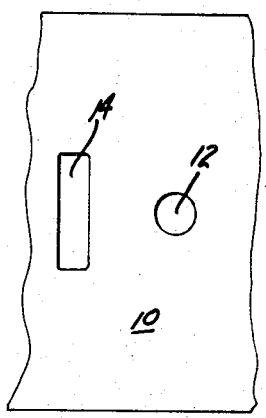
FIG. 2 is a fragmentary overhead plan view showing a typical piece of work stock after having undergone a second operation.
Figure 3:
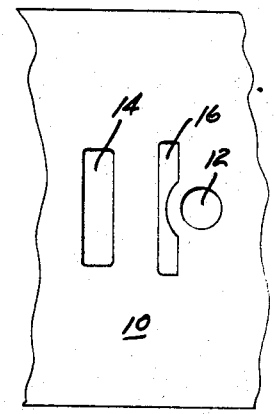
FIG. 3 is a fragmentary overhead plan view showing a typical piece of work stock after having undergone a third operation.
Figure 4:
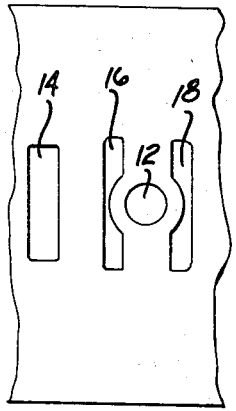
FIG. 4 is a fragmentary overhead plan view showing a typical piece of work stock after having undergone a fourth operation.

The guide hole 12 formed in the first stamping operation is for the purpose of receiving an upright indexing pin during other stamping steps in the process. In FIG. 2, a second stamping step has been carried out, by which an elongated aperture 14 is punched through the stock 10. As will be seen, aperture 14 forms the central opening in a large letter O, which for the purpose of the present description exemplifies the trim bodies producible according to the present method. In FIGS. 3 and 4, other elongate openings 16 and 18 are punched through the stock by separate stamping operations as the trim structure to be produced advances toward completion.

Figure 5:
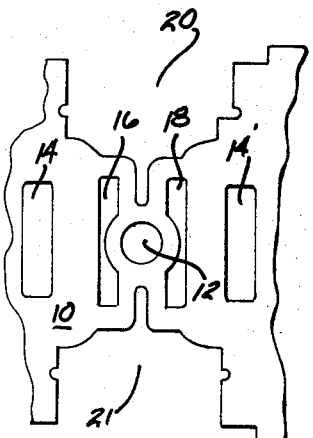
FIG. 5 is a fragmentary overhead plan view showing a typical piece of work stock after having undergone a fifth operation.
Figure 6:
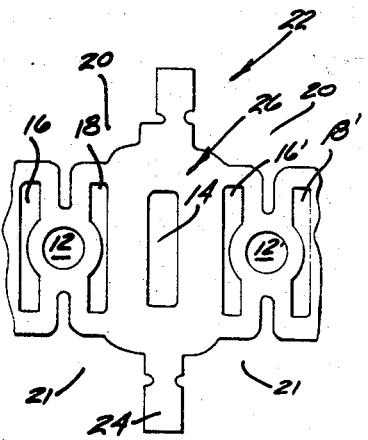
FIG. 6 is a fragmentary overhead plan view showing a typical piece of work stock after having undergone a sixth operation.

In FIG. 5, the outlines of the exemplary O-shaped trim bodies become discernible with the removal of relatively large symmetrical areas 20 and 21 from the opposite edges of the stock 10, at locations between the initial central opening 14 and a second such opening 14', which now has been punched through the stock. The portion of the formed stock located between successive guide holes 12 and 12', such as is seen at 22 in FIG. 6, is referred to herein as a "rough blank," from which the completed trim body and studs will subsequently be formed. It is to be particularly observed that in the removal of the areas 20 and 21 of the stock noted just above, a pair of laterally-projecting integrally attached appendages or stud blanks 24 are defined on each side of the rough blank 22. The area between these stud blanks is referred to as a trim body blank 26, and the trim body blank and the stud blanks 24 just described together make up the rough blank 22.

Figure 7:
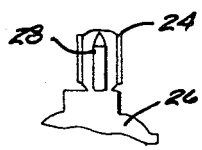
FIG. 7 is a fragmentary overhead plan view showing the results of a further operation in the subject method.
Figure 8:
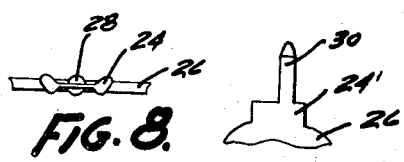
FIG. 8 is an end elevation of the structure of FIG. 7.
Figure 9:
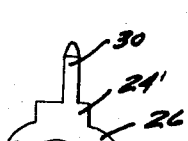
FIG. 9 is a fragmentary overhead plan view showing the results of a further operation in the subject method.
Figure 10:
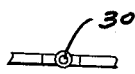
FIG. 10 is an end elevation of the structure seen in FIG. 9.

In FIG. 7, a portion of the trim body blank 26 and one of the stud blanks 24 integrally attached thereto are illustrated after a stamping operation performed on the structure seen in FIG. 6 has formed a stud projection 28 on the stud blank. This is also seen in FIG. 8, from which it will be apparent that some of the metal stock of the stud blank has been gathered in this particular stamping operation, so that the stud projection 28 may if desired actually be thicker than the stock forming the rough blank 22. As will be understood, this is accomplished by squeezing the stud blanks between dies having angularly oriented die surfaces, so that the material of the stud bank is moldably upset or flowed from one place to another, i.e., to the stud projection 28. After the forming of the stud projections in this manner, the outer portions of the stud blank surrounding the stud projection are removed by a subsequent stamping operation which trims off this now extraneous stock to leave only the sharply defined and finished attachment stud 30 which is seen in FIGS. 9 and 10.

Figure 11:
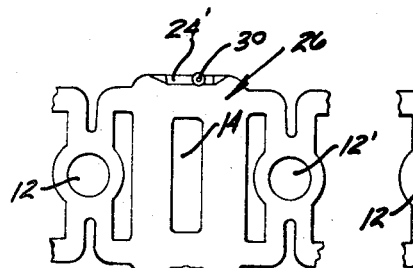
FIG. 11 is a fragmentary overhead plan view showing the workpiece of the previous figures after having undergone a further operation.
Figure 12:
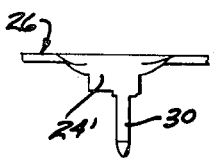
FIG. 12 is an end elevation of the structure seen in FIG. 11.

After the finished attachment studs 30 have been formed in the foregoing manner, it will be noted (FIG. 9) that a portion 24' of the original stud blank 24 remains between the stud 30 and the trim body blank 26. In subsequent stamping operations by which a finished trim body is made from the trim body blank 26, the stud blank portion 24' just noted undergoes a particular transfiguration, which will now be pointed out. As already described, the stud blanks 24 initially lie in the same plane as the remainder of the rough blank 22, since they are formed from the same flat sheet stock 10. The stud projections 28 are also formed with the stud blanks in this plane, and the finished attachment studs 30 remain in the initial plane. After the trimming operation is completed, however, the attachment studs 30 are bent at an angle to the trim body blank 26 as seen in FIGS. 11 and 12. This is readily accomplished through a stamping stage in which the die comes up beneath the laterally extending stud blank portion 24 and the studs 30 projecting from the extremities thereof to bend both of these directly upward from a peripheral edge of the trim body blank 26, so that both the studs and stud portions 24 lie substantially normal to their initial plane, i.e., that of the trim body blank 26.

Figure 13:
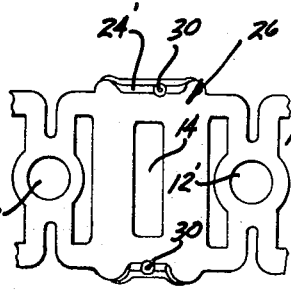
FIG. 13 is a fragmentary overhead plan view showing the workpiece of the previous figures after having undergone a further operation.

After the stud blank portions 24 and the attachment studs 30 have been bent to a position normal to the trim body blank 26, a subsequent stamping operation moves the attachment studs 30 further inwardly from the peripheral edges of the trim body blank by bending the stud blank portions 24 to an offset position as illustrated in FIG. 13. As a result of this stamping operation, the attachment studs will project normally away from the trim body blank 26 in a proper manner and position to secure the trim body to a desired supporting surface.

The operation just mentioned is readily accomplished through a stamping stage in which a cam-operated die is extended vertically upward from the bed of the press on which the stamping operations are being carried out and is actuated inwardly to perform the operation as a result of being cammed in a horizontal direction. As a result, each of the stud blank portions 24 moves toward the other laterally from the outside edges of the rough blank.

Figure 14:
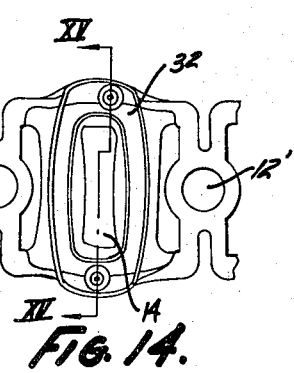
FIG. 14 is a fragmentary overhead plan view showing the workpiece of the previous figures after having undergone a further operation.
Figure 15:
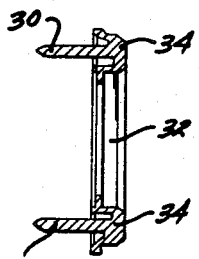
FIG. 15 is a sectional elevation taken through the vertical plane XV—XV of FIG. 14.
Figure 16:
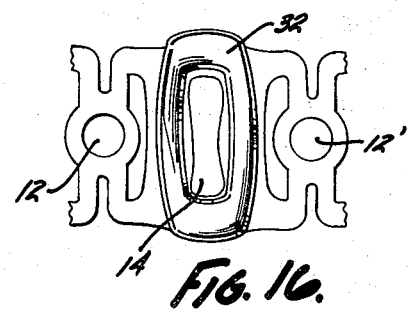
FIG. 16 is a fragmentary plan view of the underside of the structure seen in FIG. 14.

As a result of the preceding step, the attachment studs 30 are oriented inwardly of the edge of the trim body blank 26, and the finished trim body may be made from the trim body blank by means of a single stamping operation which relatively deeply embosses the desired shape of trim body into the trim body blank. The results of this step are seen in FIGS. 14, 15, and 16, which show a finished trim body 32, shown as an elliptical or prolate letter "O", whose cross section is a smoothly-rounded U-shaped recessed area or channel. Of considerable importance is the fact that the embossing die which has formed the trim body 32 does not alter the shape or the position of the vertically-extending attachment studs 30, but that this die contacts the remaining stud blank portions 24′ and forcibly upsets or flows the material in these portions such that it becomes a part of the juncture 34 (FIG. 15) of the attachment studs 30 and the trim body 32, thereby thickening this juncture and augmenting considerably the total strength of the resulting integral structure.

As seen in FIG. 16, the front or outer face of the trim body 32 is smoothly rounded and, in general, quite acceptable in appearance. However, the purpose of the elongate hole 14 in the center of the trim body (as well as the other elongate holes 16 and 18 at the sides thereof) was for stress relief during the forming of the finished trim body, and the center hole 14 as initially formed was not designed to accurately fit the center portion of the finished trim body. As shown in FIG. 16, the outlines of this hole will have been made slightly irregular due to the embossing operation which produced the finished trim body. Consequently, one of the final stamping operations is to accurately punch out the center of the finished trim body 32 so that it is given the shape shown in FIG. 17, i.e., having a cleanly finished central aperture 114.

Figure 17:
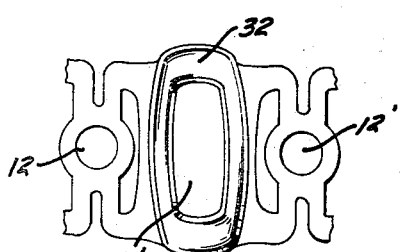
FIG. 17 is a plan view similar to FIG. 16, but showing the effect of a further operation in the method.
Figure 18:
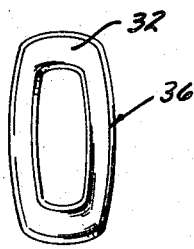
FIG. 18 is a plan view similar to FIG. 17, but showing the form of the finished object from the front or outer side thereof.
Figure 19:
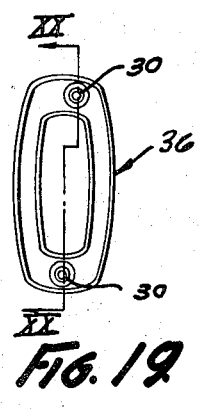
FIG. 19 is a plan view of the structure of FIG. 18, showing the rearward side thereof.
Figure 20:
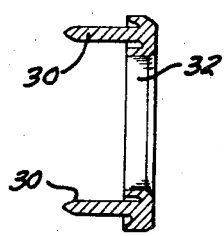
FIG. 20 is a sectional elevation taken through the vertical plane XX—XX of FIG. 19.

After placing the stock in the shape shown in FIG. 17, the final step in the process is to sever the finished trim body 32 from the remaining portions of the stock through a trimming operation involving the use of a cutting die having the same shape as the outer perimeter of the finished trim body. The resulting completely finished trim structure 36 is illustrated in FIGS. 18, 19, and 20. As may plainly be seen, this trim structure is of the desired character; that is, it has a smoothly curved and finished exterior portion and integrally attached mounting studs which together provide a one-piece structure that has more than adequate strength for typical usages of such trim structures, and which may be manufactured very quickly and economically so that the resulting trim structure offers definite competitive advantages in the close-margin market for which it is intended.

The uniqueness and the many advantages of the present novel method will likely readily appear to those skilled in the art upon a consideration of the foregoing description and upon studying the attached drawings. Consequently, it is entirely conceivable that upon examining the foregoing disclosure those skilled in the art may devise embodiments of the concept involved which differ somewhat from the embodiment shown and described herein, or may make various minor changes in details to the present embodiment. All such changed embodiments or variations in details as utilize the concepts of the invention and clearly incorporate the spirit thereof should therefore be considered as within the scope of the claims appended herebelow, unless these claims by their language specifically state otherwise.

I claim:

1. A method of manufacturing structures having body portions with integral attachment stud elements, comprising the steps: providing a rough blank of a particular shape and of a size sufficient to form a desired body and having also a desired number of integral stud blank areas in locations where attachment studs are to be located; moldably upsetting portions of said stud blank areas through pressure to form stud projections on such stud blank areas, which projections have a predetermined thickness corresponding to that which the finished attachment studs are to have; and then trimming portions of said stud blank areas away from said pressure-formed stud projections to leave only the stud projections integrally attached to the body material.

2. A method of manufacturing structures having body portions with integral attachment stud elements, comprising the steps: providing a rough blank of a particular shape and of a size sufficient to form a desired body and having also a desired number of integral stud blank areas in locations where attachment studs are to be located; moldably upsetting portions of said stud blank areas through pressure to form stud projections on such stud blank areas, which projections have a predetermined thickness corresponding to that which the finished attachment studs are to have; said step of moldably upsetting to form said stud projections including the gathering of stock from some portions of said stud blank areas into said stud projections, such that said stud projections have a thickness which is greater than that of the original ungathered stud blank areas.

3. The method of manufacture defined in claim 2, wherein said rough blank including said stud blank areas is of flat sheet stock initially, and further including an additional step of bending said stud projections at desired angles away from said body material.

4. The method of manufacture defined in claim 3, further including the step of pressure-forming a body of a desired shape from said rough blank after said stud projections have been bent at said angles to thereby form substantially finished structures with integral attachment studs.

5. The method of manufacture defined in claim 4, wherein at least some of the stock of the unformed stud blank areas is left between at least some of said stud projections and the remainder of said rough blank, and wherein during the pressure forming of said shaped body said unformed stud blank stock is pressure-formed into a portion of at least one of said body and attachment stud projections.

6. The method of manufacture defined in claim 3, wherein said stud blank areas initially comprise ear projections extending from an edge of the portion of said rough blank from which said body is to be formed and in substantially the same plane as said rough blank, wherein said stud projections are pressure-formed in the same said plane, and wherein said stud projections are brought to a position substantially normal relative to said plane during said bending step, such that the projections then extend generally normally away from such edge.

7. The method of manufacture defined in claim 5, wherein said stud blank areas initially comprise ear projections extending from an edge of the portion of said rough blank from which said body is to be formed and in substantially the same plane as said rough blank, wherein said stud projections are pressure-formed in the same said plane, and wherein said stud projections are brought to a position substantially normal relative to said plane during said bending step, such that the projections then extend generally normally away from such edge.

8. The method of manufacture defined in claim 7, wherein between the bringing of said stud projections to said substantially normal position and the said pressure-forming of said body, said stud projection and said unformed stud blank stock are offset from said edge toward the interior of the portions of said rough blank from which said body is to be formed, such that after the said forming of said body said integral attachment studs are located inwardly of the edge of said body.

9. A method of continuously, sequentially manufacturing structures with body portions having integral attachment stud elements from a long flat sheet of pressure-moldable stock, comprising the steps: feeding said sheet of stock through a plurality of successive stamping stages; shearing away predetermined portions of said stock at an early one of said stages to form a rough blank having a predetermined shape and a size sufficient to form a desired body, and having also a desired number of integral stud blank areas in locations where attachment studs are to be located; moldably upsetting portions of said stud blank areas at later one of said stages to form stud projections on said blank areas, which projections have a predetermined thickness corresponding to that which the finished attachment studs are to have; and then trimming portions of said stud blank areas away from said stud projections at another of said stages, such that after said sheet of stock has been through all of said stages there remains only the cut-out body material with its integrally attached stud projections.

10. The method of manufacture defined in claim 9, wherein the repetition of said shearing step produces a chain-like succession of separate but attached and interconnected rough blanks.

11. The method of manufacture defined in claim 10, wherein the step of forming said stud projections includes the gathering of stock from some portions of said stud blank areas into said stud projections, such that said stud projections have a thickness which is greater than that of the original ungathered stud blank areas.

12. The method of manufacture defined in claim 11, further including the step of pressure molding the desired body from said rough blank at another of said successive stamping stages.

13. The method of manufacture defined in claim 10, wherein said stud projections and rough blank are initially in substantially the same plane upon being formed from said flat sheet of stock, and wherein at least one of said successive stamping steps comprises the bending of the stud projections on successive ones of said stud blanks at desired angles away from said original plane.

14. The method of manufacture defined in claim 13, wherein at least one of said successive stamping steps comprises the pressure forming of the desired body from said rough blank after said stud projections have been bent at said angles to thereby form substantially finished structures with integral attachment studs.

15. The method of manufacture defined in claim 14, wherein said stud blank areas initially comprise ear projections extending from an edge of the portion of said rough blank from which said body is to be formed.

16. The method of manufacture defined in claim 15, wherein the step of moldably upsetting said stud blank areas to form said stud projections includes the gathering of stock from some portions of said stud blank areas into said stud projections, such that said stud projections have a thickness which is greater than that of the original ungathered stud blank areas.

17. The method of manufacture defined in claim 16, wherein at least some of the stock of the unformed stud blank areas is left between at least some of said stud projections and the remainder of said rough blank, and wherein during the pressure forming of said body said unformed stud blank stock is pressure-formed into a portion of at least one of said body and attachment stud projections.

18. The method of manufacture defined in claim 17, wherein between the bringing of said stud projections to said substantially normal position and the said pressure-forming of said body, said stud projection and said unformed stud blank stock are offset from said edge toward the interior of the portions of said rough blank from which said body is to be formed, such that after the said forming of said body said integral attachment studs are located inwardly of the edge of said body.

19. A structure having a body portion with integral attachment stud elements, comprising: a body portion formed from moldably conformable sheet stock; stud elements attached to said body portion and integral therewith, formed from said sheet stock by moldably upsetting the same under pressure; said studs being generally cylindrical in form and solid in structure; and said studs being disposed at an angle with respect to said body portion.

20. The structure defined in claim 19, wherein said stud elements are thicker than the said sheet stock from which they are formed, as a result of gathering the stock when it is moldably upset.

References Cited

UNITED STATES PATENTS

| | | | |
|---|---|---|---|
| 3,202,122 | 8/1965 | Bedford | 113—119 |
| 3,228,279 | 1/1966 | Sampson | 24—73 |

BOBBY R. GAY, *Primary Examiner.*

RAYMOND D. KRAUS, *Assistant Examiner.*

U.S. Cl. X.R.

29—417; 72—379